(12) United States Patent
Kanda

(10) Patent No.: US 11,226,204 B2
(45) Date of Patent: Jan. 18, 2022

(54) ROAD SEGMENT DETERMINATION DEVICE AND METHOD

(71) Applicant: ISUZU MOTORS LIMITED, Tokyo (JP)

(72) Inventor: Yoshitaka Kanda, Sagamihara (JP)

(73) Assignee: ISUZU MOTORS LIMITED, Tokyo (JP)

( * ) Notice: Subject to any disclaimer, the term of this patent is extended or adjusted under 35 U.S.C. 154(b) by 356 days.

(21) Appl. No.: 16/337,895

(22) PCT Filed: Sep. 27, 2017

(86) PCT No.: PCT/JP2017/034879
§ 371 (c)(1),
(2) Date: Mar. 28, 2019

(87) PCT Pub. No.: WO2018/062234
PCT Pub. Date: Apr. 5, 2018

(65) Prior Publication Data
US 2020/0033136 A1 Jan. 30, 2020

(51) Int. Cl.
*G01C 21/26* (2006.01)
*B60W 30/18* (2012.01)
(Continued)

(52) U.S. Cl.
CPC ............. *G01C 21/26* (2013.01); *B60W 30/18* (2013.01); *B60W 40/076* (2013.01);
(Continued)

(58) Field of Classification Search
None
See application file for complete search history.

(56) References Cited

U.S. PATENT DOCUMENTS 9,145,143 B2 * 9/2015 D'Amato ............ B60W 40/076
9,180,885 B2 * 11/2015 Otake ........................ B60T 7/12
(Continued)

FOREIGN PATENT DOCUMENTS

CN 102788584 A 11/2012
CN 104737216 A 6/2015
(Continued)

OTHER PUBLICATIONS

Supplementary Search Report for related EP App No. EP-EESR 17856183.3, dated Dec. 4, 2019; 8 pages.
(Continued)

*Primary Examiner* — Todd Melton
(74) *Attorney, Agent, or Firm* — Procopio, Cory, Hargreaves & Savitch LLP

(57) ABSTRACT

A segment determination device has an acquisition unit for acquiring altitude information about points on a road on which a segment is defined, a calculation unit for calculating a distance between a point where a vehicle is located and an end point of the segment, a reference point determination unit for determining a reference point that is a point closest from the end point based on the calculated distance, a feature amount determination unit for determining a feature amount that indicates gradient information, and a segment determination unit for, in a case where the feature amount is outside a predetermined range, determining a segment in which the end point of the segment is set as a start point and whichever of two points adjacent to the point more ahead of the vehicle than the reference point that is closed to the vehicle is set as an end point.

5 Claims, 7 Drawing Sheets

(51) Int. Cl.
  *B60W 40/076* (2012.01)
  *F16H 59/66* (2006.01)
  *F16H 61/02* (2006.01)

(52) U.S. Cl.
  CPC ......... *F16H 59/66* (2013.01); *B60W 2556/50* (2020.02); *F16H 2059/666* (2013.01); *F16H 2061/022* (2013.01)

(56) References Cited

U.S. PATENT DOCUMENTS

| | | | |
|---|---|---|---|
| 10,208,854 B2* | 2/2019 | Mullen | F16H 59/66 |
| 2010/0324752 A1 | 12/2010 | Suganuma et al. | |
| 2011/0106388 A1 | 5/2011 | Boeckenhoff et al. | |
| 2013/0006530 A1 | 1/2013 | Nishiuma et al. | |
| 2015/0149052 A1 | 5/2015 | Jeong et al. | |
| 2015/0224995 A1 | 8/2015 | Yamaoka | |

FOREIGN PATENT DOCUMENTS

| | | |
|---|---|---|
| JP | 2004-252152 A | 9/2004 |
| JP | 2012-242110 A | 12/2012 |
| JP | 2014-196984 A | 10/2014 |
| JP | 2014-232240 A | 12/2014 |
| JP | 2015-102243 A | 6/2015 |
| JP | 2015170138 A | 9/2015 |
| WO | 2011111145 A1 | 9/2011 |

OTHER PUBLICATIONS

International Search Report and Written Opinion for related International Application No. PCT/JP2017/034879, dated Jan. 9, 2018; 7 pages; English translation of ISR provided.
First Office Action for related CN App No. 201780060000.2 dated Mar. 5, 2021, 19 pages.

* cited by examiner

ROAD SEGMENT DETERMINATION DEVICE AND METHOD

CROSS-REFERENCE TO RELATED APPLICATIONS

This application is a U.S. National Stage entry of PCT Application No: PCT/JP2017/034879 filed on Sep. 27, 2017, which claims priority to Japanese Patent Application No. 2016-189117, filed Sep. 28, 2016, the contents of which are incorporated herein by reference.

TECHNICAL FIELD

The present disclosure relates to a segment determination device that determines a segment to be referred to when controlling a vehicle, and a segment determination method.

BACKGROUND ART

Conventionally, a segment where a gradient can be regarded as constant is set on a road on which a vehicle travels, and a control parameter of a vehicle is changed for each segment. In this case, the vehicle can change the control parameter thereof in consideration of not only gradient information of a scheduled segment through which the vehicle recently travels but also gradient information of a segment ahead of the vehicle than the defined segment. As an example of changing the control parameter, Patent Document 1 discloses a technique of calculating a degree of curvature and an average degree of inclination of a road on which a vehicle travels and controlling a shift transmission pattern of a transmission.

CITATION LIST

Patent Document

Patent Document 1: JP-A-2015-102243

SUMMARY OF THE INVENTION

Technical Problem

As described above, a control parameter of a vehicle is changed by determining a segment in which a gradient can be regarded as constant and by referring to gradient information of the defined segment. Accordingly, it is preferable to set a segment in which a gradient can be regarded as constant without a blank or an overlap on a road on which the vehicle travels. However, when only altitude information of a relative point from a point where the vehicle is located is obtained, a start point of an available segment is different for each location of the vehicle. For this reason, an end point of a segment defined in the past and a start point of a segment that is set after the vehicle moves may be not always coincident with each other.

The present disclosure is made in view of these aspects, and an object thereof is to provide a segment determination device that can set a segment in which a gradient can be regarded as constant without a blank or an overlap on a road on which a vehicle travels.

Solution to Problem

According to a first aspect of the present disclosure, there is provided a segment determination device that includes: an altitude information acquisition unit configured to acquire altitude information about a plurality of points on a road on which a segment where a vehicle travels is defined; a remaining distance calculation unit configured to calculate a distance between a point where the vehicle is located and an end point of the segment among the plurality of points; a reference point determination unit configured to determine a reference point that is a point closest from the end point of the segment among the plurality of points based on the distance calculated by the remaining distance calculation unit; a feature amount determination unit configured to determine a feature amount that indicates gradient information based on altitude information about points including the reference point and a point more ahead of the vehicle than the reference point among the plurality of points; and a segment determination unit configured to, in a case where the feature amount is outside of a predetermined range, determine a segment in which the end point of the segment is set as a start point and whichever of two points adjacent to the point ahead of the vehicle that is closer to the vehicle is set as an end point.

The feature amount determination unit may determine, as the feature amount, a sum of areas of regions surrounded by a line obtained by connecting a first point ahead of the vehicle and a second point farther from the vehicle than the first point among the plurality of points and a line obtained by sequentially connecting a plurality of points from the first point to the second point among the plurality of points.

The feature amount determination unit may calculate the sum of areas of the regions by setting one area out of a region located below the road on which the vehicle travels and a region located above the road to be positive and setting the other area to be negative to determine the feature amount.

In a case where a distance between the start point and the end point is equal to or less than a predetermined distance, the segment determination unit may determine a segment in which the point more ahead of the vehicle than the reference point is set as an end point.

According to a second aspect of the present disclosure, there is provided a segment determination method that causes a computer to implement the steps of: acquiring altitude information about a plurality of points on a road on which a segment where a vehicle travels is defined; calculating a distance between a point where the vehicle is located and an end point of the segment among the plurality of points; determining a reference point that is a point closest from the end point of the segment among the plurality of points based on the calculated distance; determining a feature amount that indicates gradient information based on altitude information about points including the reference point and a point more ahead of the vehicle than the reference point among the plurality of points; and determining, in a case where the feature amount is outside of a predetermined range, a segment in which the end point of the segment is set as a start point and whichever of two points adjacent to the point ahead of the vehicle that is closer to the vehicle is set as an end point.

Advantageous Effects of the Invention

According to the present disclosure, it is possible to set a segment in which a gradient can be regarded as constant without a blank or an overlap on a road on which a vehicle travels

DESCRIPTION OF EMBODIMENTS

First Embodiment

A segment determination device according to the first embodiment is used, for example, in a state of being mounted on a vehicle. The segment determination device acquires gradient information about a road recorded in a map unit provided in the vehicle, and sets a travel segment in which a gradient can be regarded as constant (hereinafter, referred to as a constant gradient segment). The vehicle, when traveling in a constant gradient segment in which a gradient can be regarded as constant, ensures that a control parameter for controlling an operating state of the vehicle is constant. Therefore, by setting the constant gradient segment to be longer than an undulating segment of an actual road, frequent control of the vehicle such as changing a gear stage can be avoided, and ride comfort of the vehicle can be improved.

In this specification, the term "altitude information" means an altitude equivalent value indicating a relative height of a point ahead of the vehicle in a traveling direction of the vehicle. For example, when a gradient between a point where the vehicle is located and a point that is 25 m ahead of the vehicle is 0.1, an altitude equivalent value of the point that is 25 m ahead is 0.1. Moreover, when a gradient between the point that is 25 m ahead and a point that is 50 m ahead of the point where the vehicle is located is –0.1, an altitude equivalent value of the point that is 50 m ahead is 0 obtained by adding 0.1 and –0.1. That is, an altitude equivalent value of a point that is n segments ahead of the point where the vehicle is located is obtained by, for example, adding gradients of the n segments respectively from the point where the vehicle is located. An average gradient from the point where the vehicle is located to the point that is n segments ahead is obtained by, for example, dividing the altitude equivalent value of the point that is n segment ahead by n. In this specification, absolute altitude information refers to, for example, an altitude indicating a height from sea level.

Further, in this specification, the "point ahead of the vehicle in the traveling direction" may be a "point ahead of the vehicle along the traveling direction" or a "point that overlaps the vehicle".

[Configuration of Segment Determination Device 1]

Figure 1:
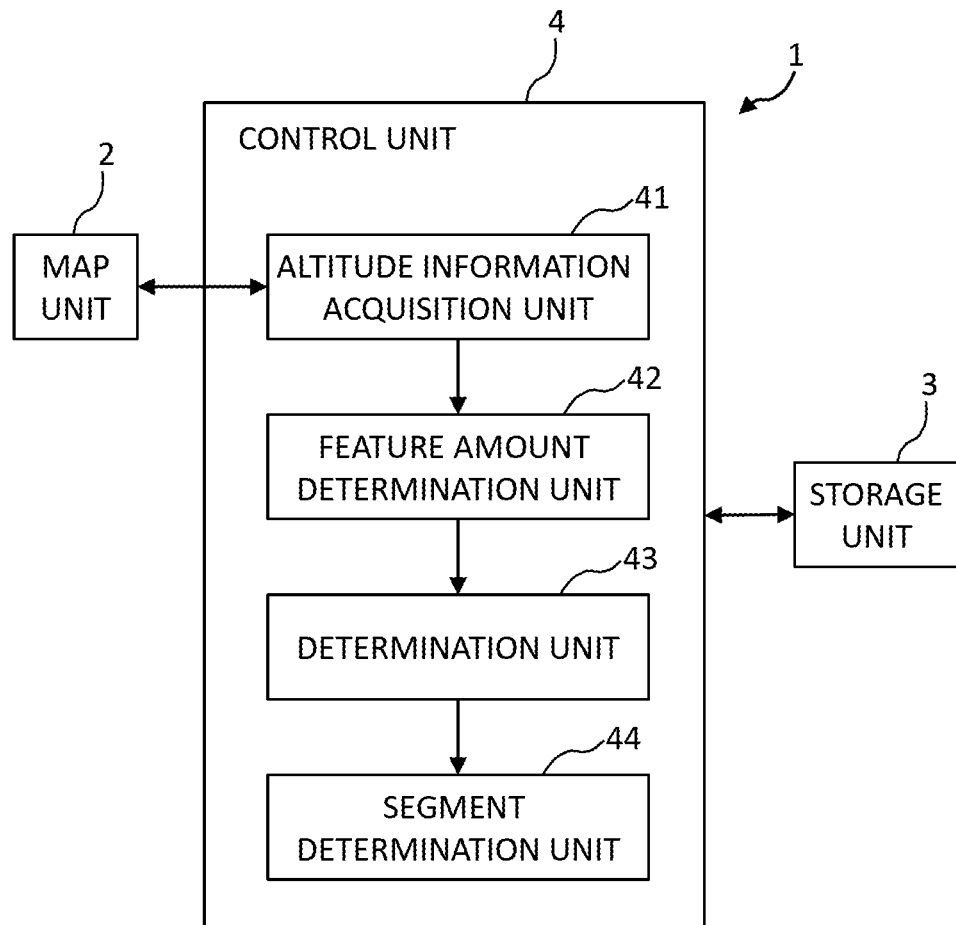
FIG. 1 shows a configuration of a segment determination device according to a first embodiment.

FIG. 1 shows a configuration of the segment determination device 1 according to the first embodiment. The segment determination device 1 includes a map unit 2, a storage unit 3, and a control unit 4. Each of the map unit 2, the storage unit 3, and the control unit 4 is connected by a wireless or wired communication line, and transmits and receives data based on a communication protocol of, for example, a Controller Area Network (CAN).

The map unit 2 has map data including, for example, absolute altitude information indicating a height of a point from the sea level and gradient information about the point from an arbitrary position in the traveling direction of the vehicle. The map unit 2 determines a current position of the vehicle in consideration of a measured value of a vehicle speed sensor, a gyro sensor, or the like, based on position information about the vehicle acquired using a Global Positioning System (GPS). The map unit 2 transmits a plurality pieces of gradient information about the road on which the vehicle travels to the control unit 4.

For example, the map unit 2 transmits, to the control unit 4, gradient information from a point where the vehicle is located to a point that is 500 m ahead at an interval of 25 m. The control unit 4 calculates and acquires altitude information about 21 points at the interval of 25 m based on the acquired gradient information. The gradient information transmitted by the map unit 2 to the control unit 4 is not limited to the gradient information from the point where the vehicle is located to the point that is 500 m ahead. The number of pieces of gradient information to be transmitted by the map unit 2 to the control unit 4 may change in accordance with a bus load allowed by a communication line to which the map unit 2 and the control unit 4 are connected. For example, the map unit 2 may transmit, to the control unit 4, gradient information about 41 points from the point where the vehicle is located to a point that is 1 km ahead at the interval of 25 m. The map unit 2 may also transmit, to the control unit 4, gradient information about 21 points from the point where the vehicle is located to a point that is 1 km ahead at an interval of 50 m. Further, instead of transmitting gradient information to the control unit 4, the map unit 2 may transmit, to the control unit 4, altitude information about 21 points from the point where the vehicle is located to the point that is 500 m ahead at the interval of 25 m.

Figure 2:
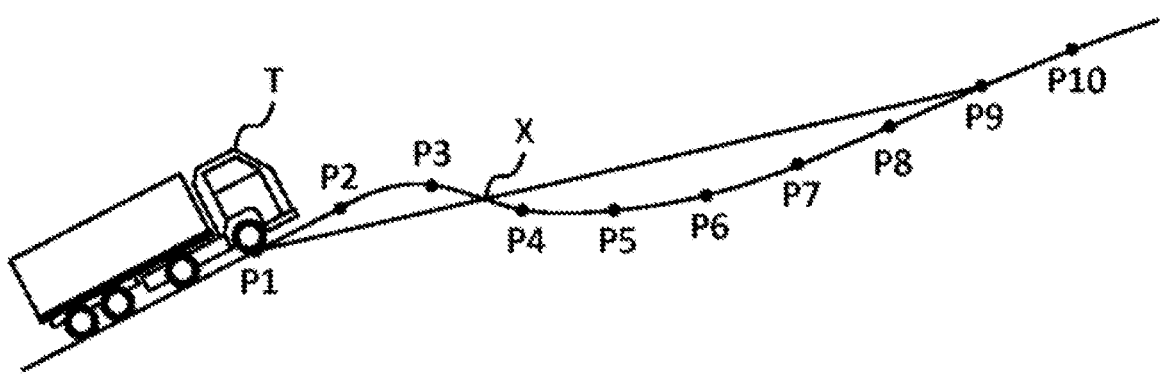
FIG. 2 illustrates an example of control of a vehicle in a constant gradient segment.

FIG. 2 illustrates an example of control of a vehicle T in a constant gradient segment. In FIG. 2, taking a current position (P1) of the vehicle T as a starting point, the segment determination device 1 can acquire gradient information about points P2, P3, ..., P10 on the road at the interval of 25 m from the map unit 2, and set a constant gradient segment based on altitude information about these points calculated after acquiring the gradient information.

The road illustrated in FIG. 2 ascends from the point P1 to the point P3, descends from the point P3 to the point P4, and ascends again from the point P4 to the point P10. When a constant gradient segment is not set, for example, the vehicle T travels at a low gear stage on an ascending road, and performs a shift control to a gear stage higher by one stage after the ascending road.

In the example illustrated in FIG. 2, the vehicle T travels at a low gear stage from the point P1 to the point P3, changes to a gear stage higher by one stage at the point P3 and travels therefrom to the point P4, and again changes to the low gear stage at the point P4 and travels therefrom to the point P10. In this manner, the gear stage of the vehicle T is changed at both of the points P3 and P4, and accordingly a driver of the vehicle T feels a slight shock caused by changing the gear stage in a relatively short interval.

Figure 3:
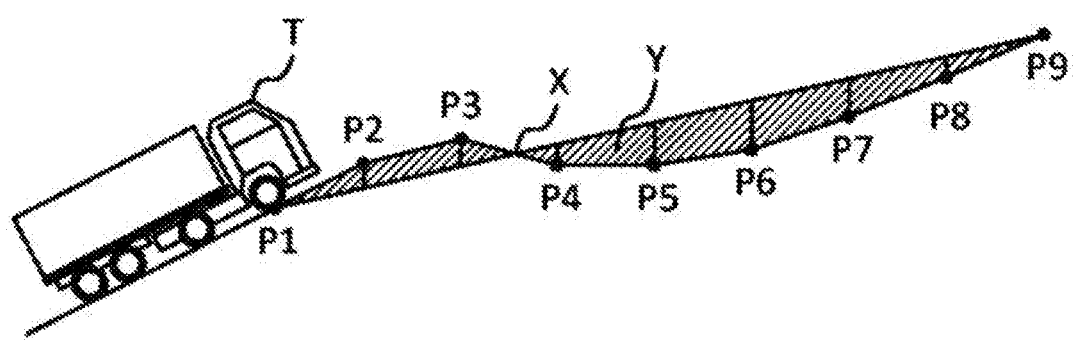
FIG. 3 illustrates processing of determining a feature amount by a feature amount determination unit.

On the other hand, as illustrated in FIG. 3, the vehicle T can travel from the point P1 to the point P9 at the same gear stage when the segment determination device 1 sets the point P1 to the point P9 as a constant gradient segment, so that the driver of the vehicle T can experience a smooth ride comfort.

The storage unit 3 includes, for example, a read only memory (ROM) in which a program executed by the control unit 4 is stored, a random access memory (RAM) that temporarily stores data during operation of the control unit 4, and a hard disk drive (HDD) that records data indicating a traveling state of the vehicle T. The ROM records a threshold referred to when the control unit 4 sets a constant gradient segment. The RAM stores altitude information calculated by the control unit 4 based on gradient information acquired from the map unit 2 and gradient information between desirable two points, as well as a feature amount used to determine a gradient segment by the control unit 4 from gradient information.

The control unit 4 is, for example, a central processing unit (CPU). The control unit 4 functions as an altitude information acquisition unit 41, a feature amount determination unit 42, a determination unit 43, and a segment determination unit 44 by reading and executing the program stored in the storage unit 3.

The altitude information acquisition unit 41 acquires gradient information about a plurality of segments on a road on which the vehicle T travels from the map unit 2, and calculates altitude information about a plurality of points which are end points of the plurality of segments. For example, as described above, the altitude information acquisition unit 41 acquires gradient information from a point where the vehicle T is located to a point that is 500 m ahead at an interval of 25 m, and calculates altitude information about the 21 points. The altitude information acquisition unit 41 acquires the gradient information every second from the map unit 2, for example. When the vehicle T travels 90 km per hour, the vehicle T proceeds 25 m per second. Accordingly, when the altitude information acquisition unit 41 acquires the altitude information every second, the altitude information acquisition unit 41 newly acquires gradient information from a point where gradient information was acquired one second before to a point that is 25 m ahead. The altitude information acquisition unit 41 records altitude information about the plurality of points calculated after acquiring the gradient information in the storage unit 3, and notifies the feature amount determination unit 42 that the altitude information is calculated.

Upon receiving the notification from the altitude information acquisition unit 41, the feature amount determination unit 42 determines a feature amount indicating gradient information about the road based on altitude information about the plurality of points including a first point ahead of the vehicle T in the traveling direction and a second point ahead of the first point among the plurality of points. For example, the first point is the point where the vehicle T is located, and the second point is a point that is 100 m ahead of the point where the vehicle T is located. The feature amount determination unit 42 records the determined feature amount in the storage unit 3, and notifies the determination unit 43 that the feature amount is determined. The feature amount determined by the feature amount determination unit 42 is described below in detail.

Upon receiving the notification from the feature amount determination unit 42, the determination unit 43 determines whether the feature amount determined by the feature amount determination unit 42 is outside of a predetermined range, and records the determination result in the storage unit 3. Here, the predetermined range is a determination reference range referred to by the determination unit 43 so as to determine whether deviation of a gradient between two points on a road on which the vehicle T travels from the actual road is within an allowable range. A specific value of this range is determined by a test taking into account, for example, vehicle weight and engine performance of the vehicle T, and a gradient of a road on which the vehicle T is assumed to travel.

When the feature amount is not outside of the predetermined range, the determination unit 43, for example, sets a flag indicating that the feature amount stored in the storage unit 3 is outside of the predetermined range to 0, and notifies the feature amount determination unit 42 that the feature amount is not outside of the predetermined range. When the feature amount determined by the feature amount determination unit 42 is not outside of the predetermined range, the segment determination device 1 calculates a feature amount again. When the feature amount is outside of the predetermined range, the determination unit 43, for example, changes the flag indicating that the feature amount stored in the storage unit 3 is outside of the predetermined range from 0 to 1, and notifies the segment determination unit 44 that a value of the flag is 1.

When the feature amount is outside of the predetermined range, the segment determination unit 44 determines a segment in which the first point serves as a start point and whichever of two points adjacent to the second point that is closer to the vehicle T serves as an end point. The segment determination unit 44 records the determined segment as a constant gradient segment in the storage segment 3. The vehicle T travels without changing the control parameter thereof, for example, when traveling in the constant gradient segment. Next, processing of determining the constant gradient segment by the segment determination device 1 is described in detail.

[Feature Amount Determined by Feature Amount Determination Unit]

FIG. 3 illustrates processing of determining a feature amount by the feature amount determination unit 42. In FIG. 3, the point P1 to the point P9 are provided on a road on which the vehicle T in FIG. 2 travels. Regions in FIG. 3 are hatched, which are surrounded by a line (polygonal line) obtained by sequentially connecting points from the point P1, which is the first point ahead of the vehicle T in the traveling direction, to the point P9, which is the second point ahead of the point P1 (the first point), and a line (straight line) obtained by connecting the point P1 and the point P9. In FIG. 3, X represents an intersection of the line obtained by sequentially connecting points from the point P1 to the point P9 and the line obtained by connecting the point P1 and the point P9. Hereinafter, as an example, processing of determining a feature amount by the feature amount determination unit 42 based on altitude information about each of the point P1 to the point P9 is described.

The feature amount determination unit 42 determines, as a feature amount, a sum of areas of the regions surrounded by the line obtained by connecting the first point ahead of the vehicle T and the second point farther from the vehicle T than the first point among the plurality of points and the line obtained by sequentially connecting the plurality of points from the first point to the second point. In FIG. 3, the first point is the point P1 and the second point is the point P9. The sum of areas calculated by the feature amount determining unit 42 is a sum of areas of the hatched regions.

For example, the feature amount determination unit 42 calculates an area of a region surrounded by the point P1, the point P2, the point P3, and the intersection X as follows. The feature amount determination unit 42 divides an altitude difference between the point P1 and the point P9 by a distance 200 m (25 m×8 points) along the road from the point P1 to the point P9, thereby obtaining a gradient of the line obtained by connecting the point P1 and the point P9.

The gradient calculated by the feature amount determination unit 42 may be different from an actual gradient since the distance along the road from the point P1 to the point P9 is different from a plane distance therebetween on a map. However, an error between the distance along the road and the plane distance on the map can be ignored for a gradient of a road on which the vehicle T is assumed to travel, so that the feature amount determining unit 42 discards the error.

For example, the feature amount determination unit 42 calculates a position coordinate of the intersection X from position coordinates of the point P3 and the point P4, a gradient of a line segment P3P4, position coordinates of the point P1 and the point P9, and a gradient of a line segment P1P9. The feature amount determination unit 42 calculates the area of the region surrounded by the point P1, the point P2, the point P3, and the intersection X based on the above calculated values and gradient information about a line segment P1P2, a line segment P2P3, and the line segment P3P4 acquired by the altitude information acquisition unit 41 from the map unit 2.

Similarly, the feature amount determination unit 42 calculates an area of a region surrounded by the intersection X, the point P4, the point P5, the point P6, the point P7, the point P8, and the point P9. Then, the feature amount determination unit 42 determines a sum of the calculated areas as a feature amount indicating gradient information.

The feature amount determination unit 42 may determine the sum of areas of the regions as a feature amount by setting one area of a region located below the road on which the vehicle T travels and a region located above the road to be positive and setting another area to be negative. In FIG. 3, for example, the feature amount determination unit 42 sets the area of the region surrounded by the point P1, the point P2, the point P3, and the intersection X to be positive, and sets the area of the region surrounded by the intersection X, the point P4, the point P5, the point P6, the point P7, the point P8, and the point P9 to be negative, thereby determining the sum of the areas of the regions as a feature amount.

Another method of determining the sum of the areas of the hatched regions in FIG. 3 by the feature amount determination unit 42 is further described. The feature amount determination unit 42 calculates a difference in a height of the line segment P1P9 from altitude information about the points P1 to P9 in FIG. 3. The difference corresponds to a length of a line segment lowered to the points P1 to P9 in FIG. 3, and is a negative value in case of the points P4 to P9 since the points P4 to P9 are below the line segment P1P9. For example, the difference at the point P4 is a negative value obtained by subtracting a value, which is obtained by multiplying the gradient of the line segment P1P9 by three times, from an altitude equivalent value at P4. The feature amount determination unit 42 determines, for example, a value obtained by adding the difference at P4 and the difference at P5 as an area of a trapezoidal region Y in FIG. 3. In this manner, the feature amount determination unit 42 can determine the areas of the hatched regions in FIG. 3 in consideration of positive and negative values. In this method of determining a feature amount, a calculation amount can be reduced since the feature amount determination unit 42 does not need to determine the intersection X.

[Determination Processing by Determination Unit 43]

The above describes the processing of determining a feature amount by the feature amount determination unit 42 based on the altitude information about the point P1 to the point P9. Hereinafter, an example of selecting a point where the feature amount determination unit 42 acquires altitude information for determining a feature amount is described.

For example, the segment determination device 1 determines whether a short segment can be set as a constant gradient segment, and continues to determine whether a lengthened sequential segment can be set as a constant gradient segment until it is determined that the segment is too long for a constant gradient segment. Here, the short segment refers to a segment having a predetermined distance determined as a minimum distance of a constant gradient segment. In other words, the predetermined distance is the minimum distance desired as a constant gradient segment.

For example, when the minimum distance is set to 100 m, the feature amount determination unit 42 first calculates a sum of areas of regions surrounded by the point P1, the point P2, the point P3, and the point P4. When the calculated sum of the areas is not outside of the predetermined range, the feature amount determination unit 42 calculates a sum of areas of regions surrounded by the point P1, the point P2, the point P3, the point P4, and the point P5. The feature amount determination unit 42 sequentially repeats the above processing until a sum of areas of regions is outside of the predetermined range.

When a distance between a start point and an end point of a segment to be determined as a constant gradient segment is equal to or less than the predetermined distance, the segment determination unit 44 may determine the segment in which the second point is set as the end point. Here, the predetermined distance is the minimum distance described above. In the above example, the minimum distance of the segment to be determined as a constant gradient segment is set to 100 m. Accordingly, when the sum of areas of regions surrounded by the point P1, the point P2, the point P3, and the point P4 is outside of the predetermined range, the segment determination unit 44 sets the point P4 as an end point of the constant gradient segment instead of the point P3 of the two points P3 and P5 adjacent to the point P4 that is closer to the vehicle T. The determination reference range referred to by the determination unit 43 is preferably determined such that, when a feature amount is determined in a segment shorter than the minimum distance, the feature amount does not fall outside of the predetermined range.

[Case where Constant Gradient Segment Cannot be Determined]

As described above, the altitude information acquisition unit 41 acquires only gradient information about a restricted segment due to limitation of the bus load allowed by the communication line connected to the map unit 2. When the road on which the vehicle T travels is flat over a long distance, the segment determination device 1 may not be able to determine a constant gradient segment based on altitude information calculated by the altitude information acquisition segment 41. In other words, a feature amount may not fall outside of the predetermined range even if the feature amount is determined based on altitude information about all points calculated by the altitude information acquisition unit 41.

In the above case, the altitude information acquisition unit 41 calculates altitude information about another plurality of points until a feature amount determined by the feature amount determination unit 42 is outside of the predetermined range. The other plurality of points includes a point farther from the vehicle T than each of the plurality of points used for determining the feature amount by the feature amount determination unit 42. For example, even if a feature amount is determined based on altitude information about 21 points calculated by the altitude information acquisition unit 41, when the feature amount is not outside of the predetermined range, the feature amount determination unit 42 determines a feature amount again based on altitude information about a plurality of points calculated based on another piece of gradient information acquired one second after the altitude information acquisition unit 41 recently acquires gradient information from the map unit 2 for calculating altitude information. When the vehicle T is traveling, altitude information about the other plurality of points includes altitude information about a point farther from the vehicle T than a point P20.

[Flow of Processing Performed by Segment Determination Device 1]

Figure 4:
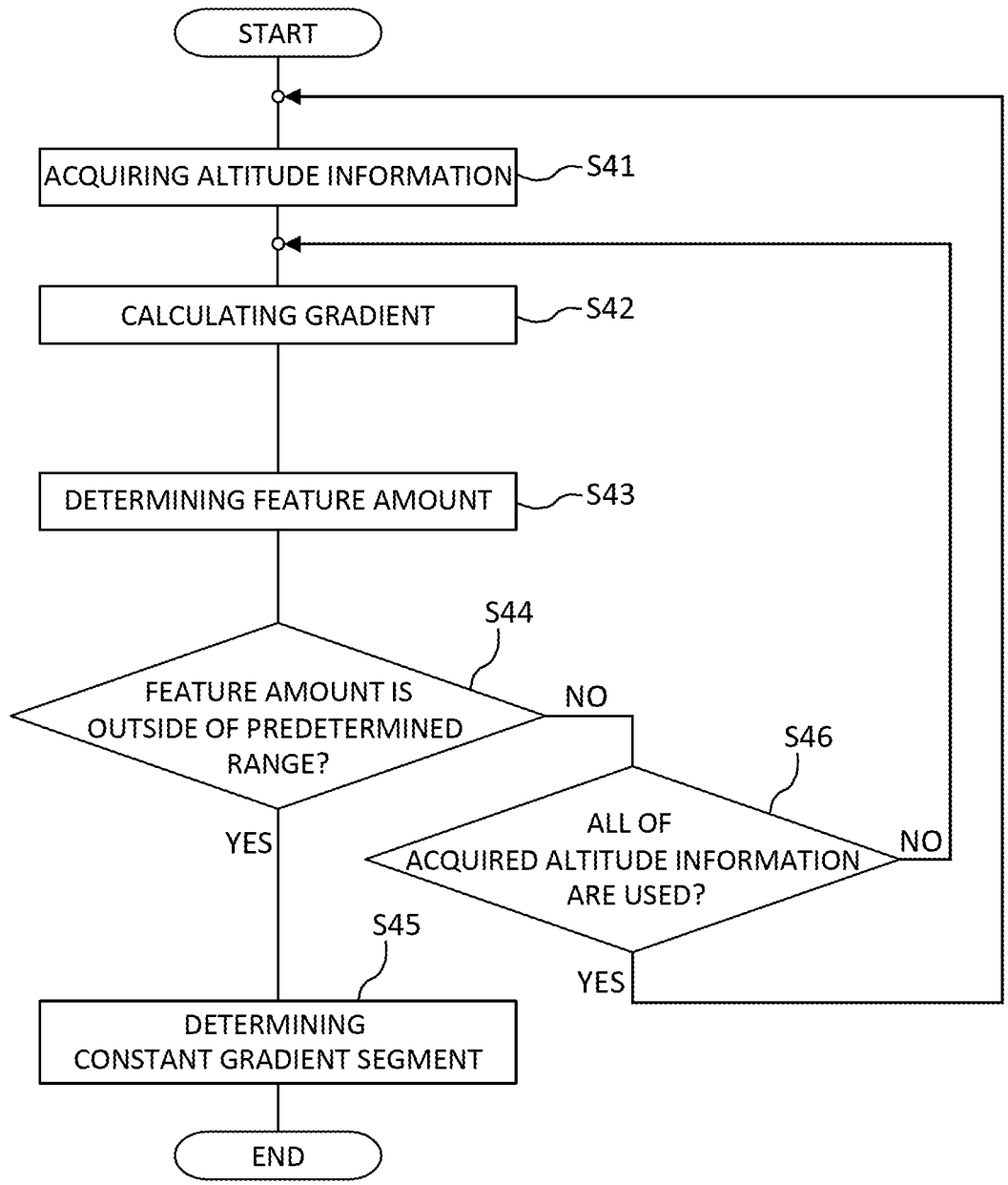
FIG. 4 is a flowchart of processing performed by the segment determination device.

FIG. 4 is a flowchart of processing performed by the segment determination device 1. The flowchart in FIG. 4 starts from a time point when the altitude information acquisition unit 41 acquires altitude information about a plurality of points from the map unit 2 (S41). After the altitude information acquisition unit 41 acquires the altitude information about a plurality of points, the feature amount determination unit 42 calculates a gradient between the plurality of points (S42). The feature amount determination unit 42 determines a feature amount indicating gradient information about the road based on the calculated gradient (S43). The determination unit 43 determines whether the feature amount determined by the feature amount determination unit 42 is outside of the predetermined range (S44).

When the feature amount is outside of the predetermined range (YES in S44), the segment determination unit 44 determines a constant gradient segment (S45) and ends the processing. When the feature amount is not outside of the predetermined range (NO in S44), the segment determination unit 44 checks whether the feature amount is determined based on altitude information about all the points calculated by the altitude information acquisition unit 41 (S46).

When the feature amount is not determined based on the altitude information about all the points calculated by the altitude information acquisition unit 41 (NO in S46), the feature amount determination unit 42 selects another plurality of points and determines a feature amount. When the feature amount is determined based on the altitude information about all the points calculated by the altitude information acquisition unit 41 (YES in S46), the altitude information acquisition unit 41 calculates altitude information about another plurality of points including a point that is farther from the vehicle T than each of the plurality of points used for determining the feature amount by the feature amount determination unit 42.

[Modification 1]

The altitude information acquisition unit 41 may acquire gradient information by changing an interval between the plurality of points for each region where the road exists. Alternatively, the map unit 2 may change the interval between the plurality of points for each region where the road exists, and transmit the gradient information to the altitude information acquisition unit 41. The road may have a long flat part or a part with large undulation depending on a region where the vehicle T travels. For example, when the vehicle T travels through a region having a long flat road, the segment determination device 1 may set an interval between points where altitude information is acquired from the map unit 2 to 50 m. In this case, the altitude information acquisition unit 41 can acquire altitude information up to a point that is 1 km ahead even if only altitude information about 21 points can be acquired. Accordingly, the segment determination device 1 can easily determine a constant gradient segment.

[Modification 2]

The determination unit 43 may determine a segment by changing the predetermined range to be compared with the feature amount for each region where the road exists. As described above, the road may have a long flat part or a part with large undulation depending on a region where the vehicle T travels. When the vehicle T travels on a road having large undulation, the determination unit 43 may perform determination by changing the predetermined range to be compared with the feature amount to a small range. In this manner, a constant gradient segment is determined easily, and a constant gradient segment determined by the segment determination device 1 has a little deviation from the actual road.

[Modification 3]

The segment determination device 1 may determine a plurality of constant gradient segments instead of only one constant gradient segment. In the above description, the segment determination device 1 determines one constant gradient segment from the point P1 to the point P9. However, the segment determination device 1 may determine a constant gradient segment that is ahead of the point P9 based on altitude information about the point P9 to the point P20 (not illustrated). In this manner, the vehicle T can determine the control parameter of the vehicle T when traveling in a constant gradient segment determined at beginning based on information about a constant gradient segment that is ahead of the constant gradient segment determined at beginning in the traveling direction of the vehicle T. Specifically, by determining a constant gradient segment ahead of the constant gradient segment in which the vehicle T travels, for example, a state of the gear stage suitable for the constant gradient segment ahead can be realized in advance in the constant gradient segment in which the vehicle T is currently traveling.

When a feature amount obtained by adding a feature amount determined by the feature amount determination unit 42 when determining a first segment and a feature amount determined by the feature amount determination unit 42 when determining a second segment is within the predetermined range, the segment determination unit 44 may determine a segment in which the first segment and the second segment are merged. Specifically, the segment determination unit 44 may determine a segment that takes the start point P1 of the constant gradient segment close to the vehicle T and an end point (P14, for example) of another constant gradient segment far from the vehicle T as two ends. In this manner, the segment determination device 1 can determine a constant gradient segment having a long distance.

When a difference between a gradient of a first segment and a gradient of a second segment is within a predetermined range, the segment determination unit 44 may determine a segment in which the first segment and the second segment are merged. The predetermined range is, for example, a value of a gradient difference that does not cause great discomfort of a driver without changing the control parameter of the vehicle T between the first segment and the second segment, which is determined by a test.

Effects of Segment Determination Device 1 According to First Embodiment

As described above, the segment determination device 1 acquires altitude information about a plurality of points, and determines a feature amount indicating gradient information about a road based on the altitude information about a plurality of points. When the feature amount is outside of a predetermined range, the segment determination device 1 determines a constant gradient segment. In this manner, when the feature amount is not outside of the predetermined range, that is, when the feature amount determined by the feature amount determination unit 42 is sufficiently small that the gradient does not change, the segment determination device 1 tries to determine a constant gradient segment with a longer distance. That is, the segment determination device 1 can set a long segment in which the vehicle T is operated without frequently changing the control parameter.

Further, the segment determination device 1 determines, as a feature amount, a sum of areas of regions surrounded by a line obtained by connecting a first point ahead of the vehicle T to a second point farther from the vehicle T than the first point among a plurality of points and a line obtained by sequentially connecting the plurality of points from the first point to the second point. In this manner, the segment determination device 1 can set a constant gradient segment in which an error with respect to the actual road falls within a predetermined range.

Further, the segment determination device 1 determines the sum of areas of the regions surrounded by lines as a feature amount by setting one area of a region located below the road on which the vehicle T travels and a region located above the road to be positive and setting another area to be negative. In this manner, when the road on which the vehicle T travels goes up and down in a short distance, the segment determination device 1 can set the constant gradient segment to be long.

When a distance between a start point and an end point is equal to or less than a predetermined distance, the segment determination device 1 determines a segment in which the second point is set as an end point. In this manner, the segment determination device 1 can set a constant gradient segment to be equal to or larger than the predetermined distance.

Further, the segment determination device 1 acquires altitude information by changing an interval between a plurality of points for each area where the road exists. In this manner, the segment determination device 1 can acquire gradient information over a long distance in a region in which the road has a gentle gradient. As a result, the segment determination device 1 can set a constant gradient segment having a long distance.

Further, the segment determination device 1 acquires altitude information about a plurality of points on a road on which the vehicle T travels, and determines a feature amount indicating gradient information about the road based on the altitude information about a plurality of points including a first point that is ahead of the vehicle T in the traveling direction and a second point that is farther from the vehicle T than the first point among the plurality of points. The segment determination device 1 acquires altitude information about another plurality of points until the determined feature amount is outside of the predetermined range. The other plurality of points includes a point farther from the vehicle T than each of the plurality of points used for determining the feature amount. When the feature amount is outside of the predetermined range, the segment determination device 1 determines a segment in which the first point serves as a start point and whichever of two points adjacent to the second point that is closer to the vehicle T serves as an end point. In this manner, the segment determination device 1 can set a constant gradient segment without setting an upper limit on a distance thereof. Therefore, the vehicle T on which the segment determination device 1 is mounted can determine the same constant gradient segment over a long distance, and does not change the control parameter thereof frequently.

Second Embodiment

Modification 3 of the first embodiment describes a case of determining a plurality of constant gradient segments by the segment determination device 1. After determining a plurality of constant gradient segments, the segment determination device 1 according to the second embodiment determines an end point for a first determined constant gradient segment. For a second determined constant gradient segment and thereafter, the segment determination device 1 performs calculation again when the vehicle T travels through the first determined constant gradient segment and updates segments. When updating the second determined constant gradient segment and thereafter, the segment determination device 1 recalculates a constant gradient segment based on altitude information about a plurality of points from a point where the vehicle T is located at a time point of updating the segment to a point ahead in a traveling direction. The segment determination device 1 determines an end point of the second constant gradient segment at a time point when the vehicle T reaches the end point of the first determined constant gradient segment.

That is, the segment determination device 1 according to the second embodiment provisionally determines the second constant gradient segment, and determines the second constant gradient segment that is updated recently as a constant gradient segment to travel next at a time point of traveling though the first constant gradient segment. By provisionally determining and updating the second constant gradient segment and thereafter continuously, the segment determination device 1 according to the second embodiment can determine a control parameter (for example, a gear stage) when the vehicle T travels through a constant gradient segment that is set as a travel segment based on information about the second constant gradient segment and thereafter that are not set as a travel segment.

Figure 5:
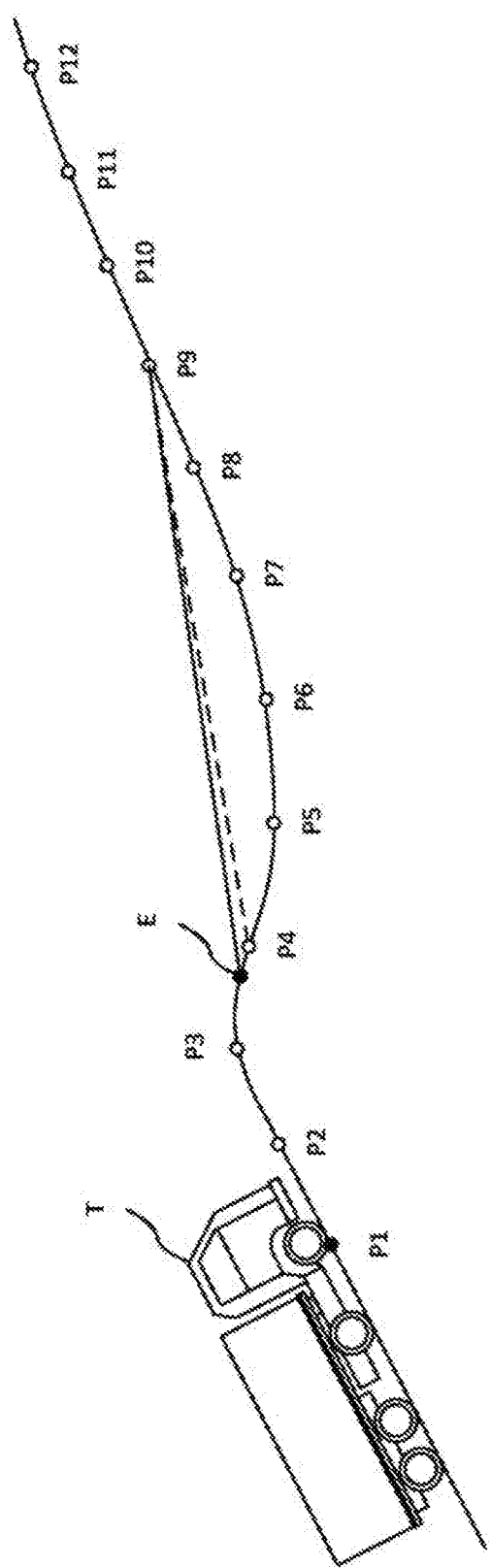
FIG. 5 illustrates processing of determining a second constant gradient segment by the segment determination device.

FIG. 5 illustrates processing of determining a second constant gradient segment by the segment determination device 1. A point E in the figure is an end point of the first constant gradient segment that is set as a travel segment. The point P1 is where the vehicle T is located, and the points P1 to P12 are where the vehicle T can acquire altitude information. Similarly to the first embodiment, the points P1 to P12 are, for example, provided at an interval of 25 m on an actual road.

The segment determination device 1 acquires gradient information between a plurality of points provided at an equal interval from a point where the vehicle T is located from the map unit 2. Accordingly, when the vehicle T starts to travel through a constant gradient segment in which the end point E is determined, altitude information about the end point E is not always calculated. Therefore, it is not always possible for the segment determination device 1 to determine a feature amount based on altitude information about a plurality of points starting at the end point E of a constant gradient segment. For this reason, in FIG. 5, the segment determination device 1 determines a feature amount of a plurality of points starting at a point that is closest to the end point E, and determines the second constant gradient segment.

When the point that is closest to the end point E is the point P4, a blank from the end point E to the point P4 is generated between the constant gradient segment having the end point E determined and the second provisionally determined constant gradient segment. In this case, the segment determination device 1 according to the second embodiment determines a second constant gradient segment so that no blank is generated with respect to the constant gradient segment having an end point determined.

When the point that is closest to the end point E is the point P3, an overlap from the point P3 to the end point E is generated between the constant gradient segment having the end point E determined and the second provisionally determined constant gradient segment. In this case, the segment determination device 1 according to the second embodiment determines a second constant gradient segment so that no overlap is generated with respect to the constant gradient segment having an end point determined.

Figure 6:
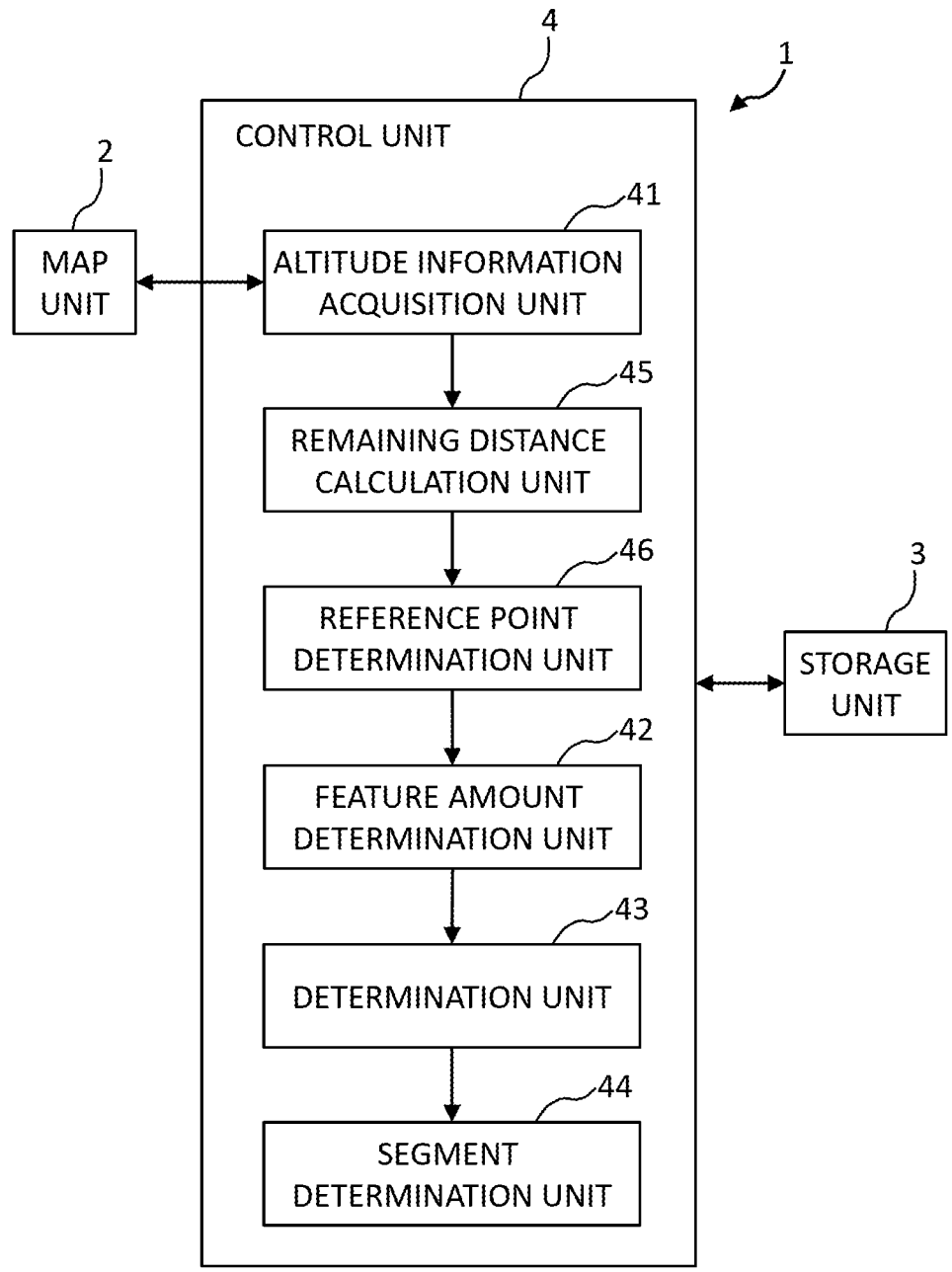
FIG. 6 shows a configuration of a segment determination device according to a second embodiment.

Configuration of Segment Determination Device 1 According to Second Embodiment FIG. 6 shows a configuration of the segment determination device 1 according to the second embodiment. The segment determination device 1 according to the second embodiment further includes a remaining distance calculation unit 45 and a reference point determination unit 46, which is different from the segment determination device 1 according to the first embodiment.

The altitude information acquisition unit 41 calculates altitude information about a plurality of points on a road on which a travel segment through which the vehicle T travels is defined. The plurality of points includes a point where the vehicle T is located.

The remaining distance calculation unit 45 calculates a distance between a point where the vehicle T is located and an end point of a segment where the vehicle T travels among the plurality of points where the altitude information acquisition unit 41 calculates altitude information. The distance between the point where the vehicle T is located and the end point of the segment where the vehicle T travels is calculated based on a set length of a constant gradient segment and elapsed time and vehicle speed after the vehicle T travels through the constant gradient segment. Specifically, the remaining distance calculation unit 45 calculates a remaining distance of a constant gradient segment by subtracting a distance through which the vehicle T actually travels in the constant gradient segment from the set length of the constant gradient segment.

The reference point determination unit 46 determines a reference point that is a point closest to the end point of the segment among the plurality of points based on the distance calculated by the remaining distance calculation unit 45. Specifically, the reference point determination unit 46 determines, as a reference point, a point closest to the remaining distance from the point where the vehicle T is located among the points where the altitude information is acquired.

The reference point determination unit 46 may divide the remaining distance of the constant gradient segment by an interval between the plurality of points where altitude information is calculated, and set a value obtained by rounding off fractions to be a number of a point to be determined as a reference point. For example, when the altitude information acquisition unit 41 calculates altitude information at an interval of 25 m from the point where the vehicle T is located, if the remaining distance of the constant gradient segment is 80 m, 80 is divided by 25 to obtain 3.2, and 3 is obtained by rounding off a fraction 0.2 of 3.2. Accordingly, a third point P4 from the current position P1 of the vehicle T is determined as a reference point.

The feature amount determination unit 42 determines a feature amount indicating gradient information based on altitude information about a plurality of points including the reference point and a point that is farther from the vehicle T than the reference point. That is, according to the first embodiment, the feature amount determination unit 42 determines a feature amount when a start point is replaced with the reference point.

When the feature amount is outside of a predetermined range, the segment determination unit 44 sets another segment in which the end point of the constant gradient segment is set as a start point and whichever of two points adjacent to the point far from the vehicle T that is closer to the vehicle T is set as an end point.

This is described in detail with reference to FIG. 5. For example, when the feature amount determination unit 42 determines a feature amount based on altitude information about a plurality of points from the point P4, which is the reference point, to the point P9, it is assumed that the feature amount is outside of the predetermined range. In this case, the segment determination unit 44 provisionally determines a value obtained by adding a distance from the end point E of the constant gradient segment to the point P4 to a distance from the point P4 to the point P9 as a second constant gradient segment. In other words, by determining a segment in which the segment from the end point E to the point P4 (solid line portion in FIG. 5) is added to the segment (broken line portion in FIG. 5) from the point P4 to the point P9, no blank is generated between the first constant gradient segment and the second provisionally determined constant gradient segment.

[Flow of Processing for Determining Segment by Segment Determination Device 1]

Figure 7:
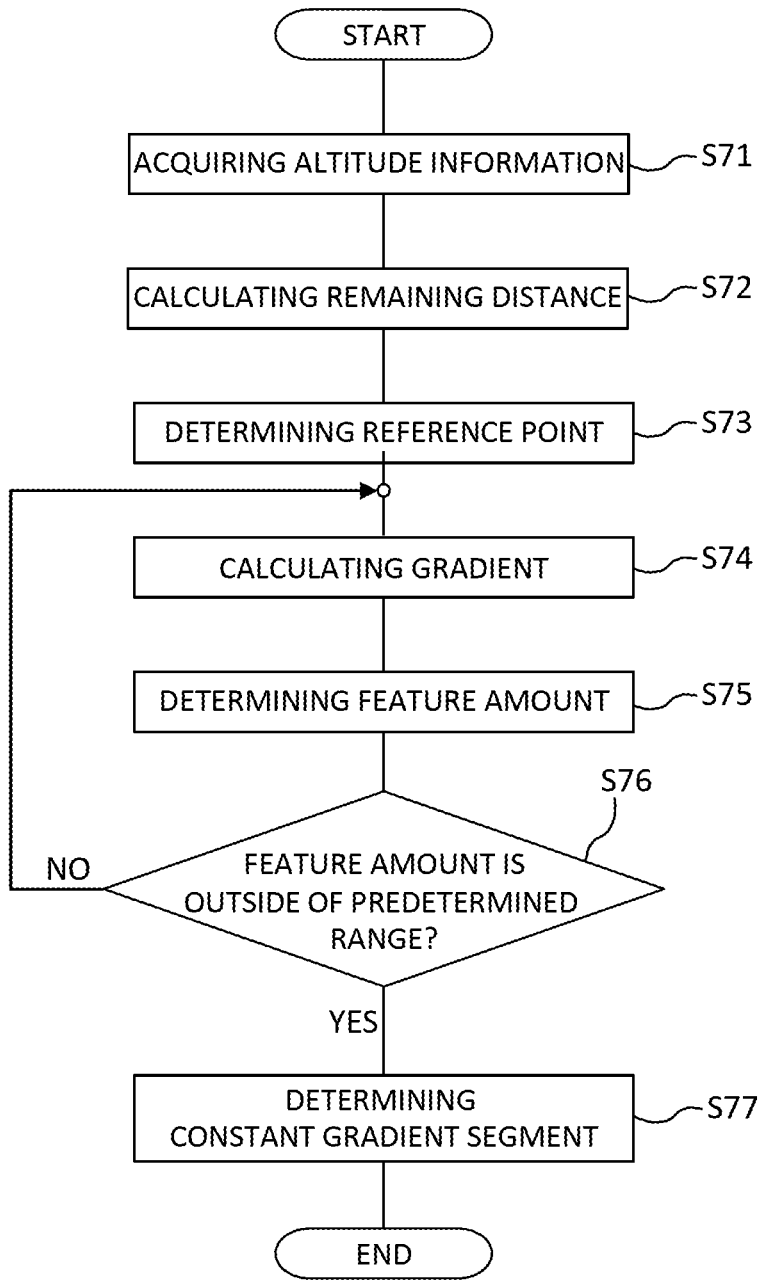
FIG. 7 is a flowchart of processing of determining the segment by a segment determination device.

FIG. 7 is a flowchart of processing for determining a segment by the segment determination device 1. The flowchart in FIG. 7 starts from a time point when the altitude information acquisition unit 41 calculates altitude information about a plurality of points from the map unit 2 (S71). After the altitude information acquisition unit 41 calculates the altitude information about a plurality of points, the remaining distance calculation unit 45 calculates a remaining distance of a constant gradient segment through which the vehicle T travels (S72). Subsequently, the reference point determination unit 46 determines a reference point that is a point closest to an end point of the constant gradient segment among the plurality of points (S73). The feature amount determination unit 42 calculates a gradient between the plurality of points (S74). The feature amount determination unit 42 determines a feature amount indicating gradient information about the road based on the calculated gradient (S75). The determination unit 43 determines whether the feature amount determined by the feature amount determination unit 42 is outside of the predetermined range (S76).

When the feature amount is outside of the predetermined range (YES in S76), the segment determination unit 44 determines a constant gradient segment (S77) and ends the processing. When the feature amount is not outside of the predetermined range (NO in S76), the feature amount determination unit 42 selects a plurality of points again and determines a feature amount indicating gradient information.

Effects of Segment Determination Device 1 According to Second Embodiment

As described above, the segment determination device 1 according to the second embodiment calculates a distance between the point where the vehicle T is located and the end point of the segment among the plurality of points, and determines a reference point that is a point closest to the end point of the segment among the plurality of points based on the calculated distance. The segment determination device 1 determines a feature amount indicating gradient information based on altitude information about a plurality of points including the reference point and the point far from the vehicle T among the plurality of points. When the feature amount is outside of the predetermined range, the segment determination device 1 sets another segment in which the end point of the segment is set as a start point and whichever of two points adjacent to the point far from the vehicle T that is closer to the vehicle T is set as an end point. Accordingly, the vehicle T can travel through the next constant gradient segment in an optimal state by updating or not updating the control parameter in accordance with gradient information ahead.

In the above description, the segment determination device 1 provisionally determines a second constant gradient segment, and determines the second constant gradient segment that is updated recently as a constant gradient segment to travel next at a time point of traveling though the first constant gradient segment. The segment determination device 1 may determine the first constant gradient segment again when the next gradient information is acquired after the vehicle T travels through the first constant gradient segment instead of when the vehicle T travels through the first constant gradient segment. Also in this case, since the constant gradient segment ahead of the first constant gradient segment through which the vehicle T is traveling through is determined provisionally, the vehicle T can travel through the next constant gradient segment in an optimal state by updating or not updating the control parameter after traveling through the set constant gradient segment.

Although the present disclosure has been described with the first and the second embodiments, the technical scope of the present disclosure is not limited to the scope described in the above-described embodiments. It is apparent to those skilled in the art that various modifications or improvements may be made to the above embodiments. It is also apparent from the description of the scope of claims that an embodiment with such modifications or improvements can be included in the technical scope of the present disclosure.

This application is based on Japanese patent application (P2016-189117) filed on Sep. 28, 2016, and contents of which is incorporated herein by reference.

INDUSTRIAL APPLICABILITY

The present disclosure has such an advantage that it is possible to set a segment in which a gradient can be regarded as constant without a blank or an overlap on a road on which a vehicle travels, and is useful for a segment determination device and a segment determination method.

LIST OF REFERENCE NUMERALS

T Vehicle
1 Segment determination device
2 Map unit
3 Storage unit
4 Control unit
41 Altitude information acquisition unit
42 Feature amount determination unit
43 Determination unit
44 Segment determination unit
45 Remaining distance calculation unit
46 Reference point determination unit

The invention claimed is:
1. A segment determination device comprising:
at least one memory configured to store a program; and
a central processing unit (CPU) coupled to the at least one memory and configured to execute the program to:
acquire altitude information about a plurality of points on a road where a vehicle travels is defined;
calculate a distance between a point where the vehicle is located and an end point of a first constant gradient segment, which is determined as a segment in which a gradient can be regarded as constant, among the plurality of points when the vehicle travels through the first constant gradient segment;
determine a reference point that is a point closest from the end point of the first constant gradient segment among the plurality of points ahead of the vehicle, based on the calculated;
determine a feature amount that indicates gradient information based on altitude information about points including the reference point and a second point more ahead of the vehicle than the reference point among the plurality of points; and
in a case where the feature amount is outside of a predetermined range and the reference point is located ahead of the end point of the first constant gradient segment, determine a second constant gradient segment, which is subsequent to the first constant gradient segment, in which the end point of the first constant gradient segment is set as a start point of the second constant gradient segment and the second point is set as an end point of the second constant gradient segment,
wherein the second constant gradient segment is a segment of the road in which a gradient can be regarded as constant, and the vehicle sets a constant gear stage of a transmission of the vehicle while traveling over the second constant gradient segment according to the gradient information.

2. The segment determination device according to claim 1,
wherein the CPU is further configured to execute the program to determine, as the feature amount, a sum of areas of regions surrounded by a line obtained by connecting a first point ahead of the vehicle and the second point farther from the vehicle than the first point among the plurality of points and a line obtained by sequentially connecting a plurality of points from the first point to the second point among the plurality of points.

3. The segment determination device according to claim 2,
wherein the CPU is further configured to execute the program to calculate the sum of areas of the regions by setting one area out of a region located below the road on which the vehicle travels and a region located above the road to be positive and setting the other area to be negative to determine the feature amount.

4. The segment determination device according to claim 1,
wherein in a case where a distance between the start point of the second constant gradient segment and the end point of the second constant gradient segment is equal to or less than a predetermined distance, the CPU is further configured to execute the program to determine a segment in which a point more ahead of the vehicle than the reference point is set as an end point of the segment.

5. A segment determination method that causes a computer to implement the steps of:
   acquiring altitude information about a plurality of points on a road where a vehicle travels is defined;
   calculating a distance between a point where the vehicle is located and an end point of a first constant gradient segment, which is determined as a segment in which a gradient can be regarded as constant, among the plurality of points when the vehicle travels through the first constant gradient segment;
   determining a reference point that is a point closest from the end point of the first constant gradient segment among the plurality of points ahead of the vehicle, based on the calculated distance;
   determining a feature amount that indicates gradient information based on altitude information about points including the reference point and a second point more ahead of the vehicle than the reference point among the plurality of points; and
   determining, in a case where the feature amount is outside of a predetermined range and the reference point is located ahead of the end point of the first constant gradient segment, a second constant gradient segment, which is subsequent to the first constant gradient segment, in which the end point of the first constant gradient segment is set as a start point of the second constant gradient segment and the second point is set as an end point of the second constant gradient segment,
   wherein the second constant gradient segment is a segment of the road in which a gradient can be regarded as constant, and the vehicle sets a constant gear stage of a transmission of the vehicle while traveling over the second constant gradient segment according to the gradient information.

* * * * *